No. 830,669. PATENTED SEPT. 11, 1906.
A. MENARD.
ELEVATOR.
APPLICATION FILED DEC. 12, 1905.
2 SHEETS—SHEET 1.
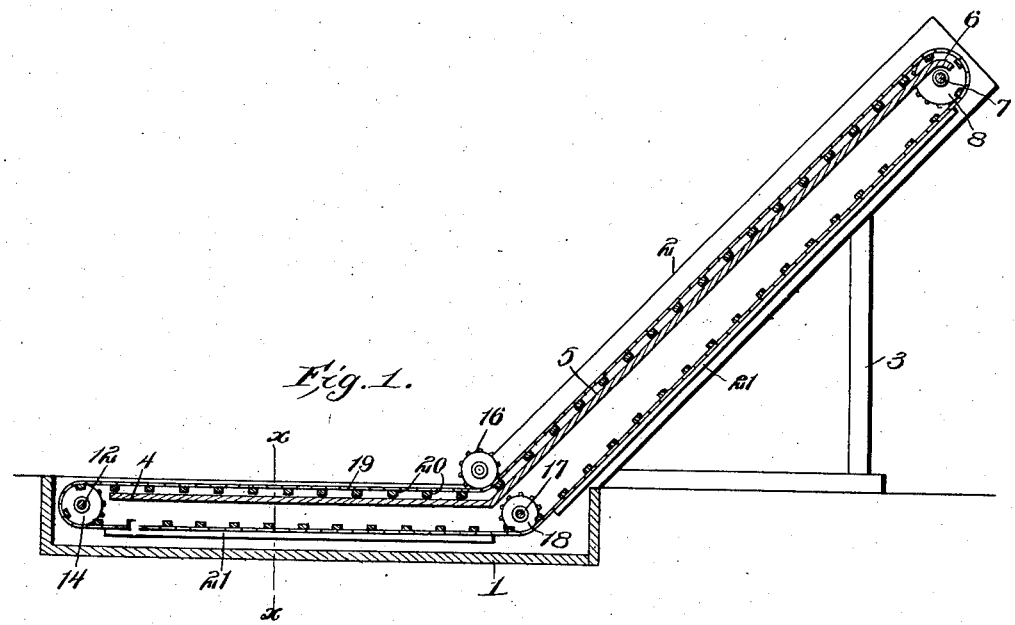
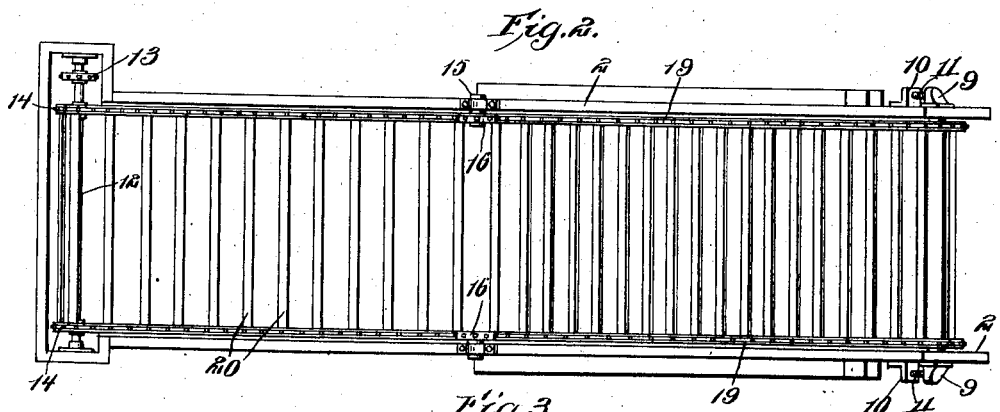
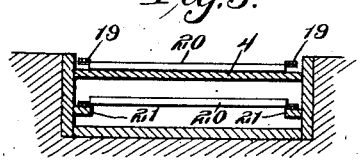
Witnesses
Inventor
Alfred Menard
By W. J. FitzGerald & Co.,
Attorneys

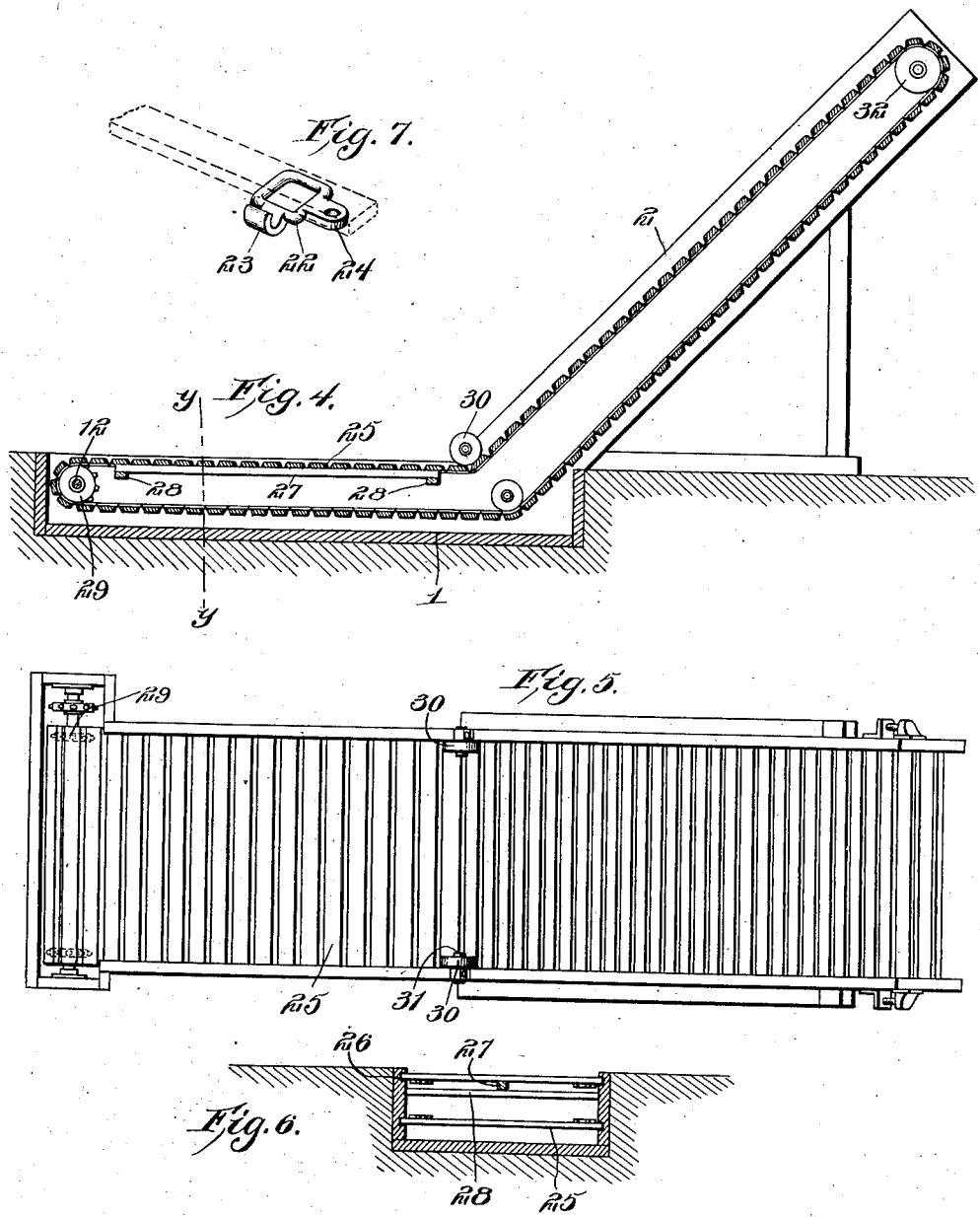

UNITED STATES PATENT OFFICE.

ALFRED MENARD, OF SALIX, IOWA.

ELEVATOR.

No. 830,669. Specification of Letters Patent. Patented Sept. 11, 1906.

Application filed December 12, 1905. Serial No. 291,423.

*To all whom it may concern:*

Be it known that I, ALFRED MENARD, a citizen of the United States, residing at Salix, in the State of Iowa, have invented certain new and useful Improvements in Elevators; and I do hereby declare the following to be a full, clear, and exact description of the invention, such as will enable others skilled in the art to which it appertains to make and use the same.

My invention relates to elevators, and particularly to devices of this character adapted to be used for loading wagons.

The object of the invention is to provide a simple form of elevator which can be operated by any suitable power and which will effectively elevate any material deposited upon it.

The invention consists of certain novel features of construction and combination of parts hereinafter more fully described and claimed.

In the accompanying drawings I have shown the preferred form of my invention, and in said drawings—

Figure 1 is a central longitudinal section through the elevator. Fig. 2 is a plan view thereof. Fig. 3 is a section on line $x\,x$, Fig. 1. Fig. 4 is a central longitudinal section through a modified form of elevator. Fig. 5 is a plan view thereof. Fig. 6 is a section on line $y\,y$, Fig. 4; and Fig. 7 is a detail view of one of the chain-links and showing by dotted lines a slat in position thereon.

Referring to the figures by numerals of reference, 1 is a box-like casing, the sides of which extend upward from one end of the box at an incline, as shown at 2, and are supported by standards 3. Arranged between the sides of the casing 1, adjacent their upper edges, is a horizontal platform 4, which merges at one end into an inclined platform 5, which is disposed between the inclined sides 2 and extends to a point adjacent the upper ends thereof, where it terminates in a downwardly-curved flange 6. This flange overlaps a shaft 7, which extends through the upper ends of the sides 2 and has sprockets 8 thereon near the sides 2. This shaft 7 is journaled in boxes 9, slidably mounted within the sides 2 and adjustably supported upon ears 10 by means of adjusting-screws 11. Another shaft 12 is journaled within the sides of the casing 1, near the forward end thereof, and has a drive-sprocket 13 thereon adapted to be operated by any suitable power. (Not shown.)

Two other sprockets 14 are secured to the shaft close to the sides of the casing. Mounted on each side of the casing, near the adjoining ends of the platforms 4 and 5, are stud-shafts 15, having sprockets 16 thereon, and a shaft 17 extends from side to side of the casing below the platforms and close to their adjoining ends and has sprockets 18 mounted thereon adjacent the sides of the casing. Two endless chains 19 are employed in connection with the elevator, and one chain is located along each side of the device. Each chain extends around one of the sprockets 8, thence over platform 5, under one of the sprockets 16, over the platform 4 and around one of the sprockets 14, and thence under the platforms 4 and 5 and one of the sprockets 17. The two chains are connected by slats 20, which are spaced apart suitable distances, and these slats are so fastened to the chains as to slide upon the upper surfaces of the platforms. Cleats 21 are secured to the sides 2 and to the sides of the casing 1 and are adapted to support those portions of the chains located under the platform.

The elevator herein described is adapted to be placed upon the ground, or, if preferred, the casing 1 thereof can be located below the surface, so that the horizontal portion of the apron will lie substantially flush with the surface.

Material to be elevated can be piled upon the platform 4 and that portion of the apron disposed thereabove, and by rotating the shaft 12 the apron can be caused to move upward upon the platform 5, and the slats will therefore engage material and convey it upward to the downwardly-curved flange 6, where it will be discharged into a vehicle or receptacle located thereunder. As the platforms are contacted by the slats, it will be understood that the apron is relieved of all strain except that exerted by the longitudinal pull thereon. Moreover, the cleats 21 support that portion of the apron below the platforms, and therefore the apron is held at all times in proper position and cannot become displaced from the sprockets. By disposing the casing 1 below the surface of the ground a wagon containing material to be elevated can be driven into position upon the platform 4 without injuring it.

In lieu of providing the construction hereinbefore described I may, if desired, utilize the modified form shown in Figs. 4 to 7, wherein the chains are made up of a series of links 22, having hooks 23 extending therefrom, whereby the links may be placed in engagement one with the other, and a laterally-extending ear 24 extends from each link. Secured upon these ears and extending over the links are parallel slats 25, having their edges beveled, and the ends of these slats project into grooves or channels 26, formed in the sides of the casing 1 and the inclined sides 2. The upper horizontal portion of the endless carrier formed in this manner is preferably supported along its longitudinal center by means of a cleat 27, mounted on cross-bars 28, and sprockets 29 are secured to the shaft 12 and engage the links of the chains. Rollers 30 are mounted on studs 31 at the bottom of the inclined slides 2 and bear upon the upper and lower portions of the conveyer at the sides thereof and along roll 32 serves to support the upper end of the conveyer in lieu of the sprockets shown in Figs. 1 and 2. With this form of conveyer a practically unbroken platform is provided, and it becomes unnecessary to utilize more than two drive-sprockets 29.

What I claim is—

In an elevator of the character described, the combination with a casing adapted to be embedded below the surface of the ground and having a support disposed longitudinally therein; of inclined sides extending from the casing, sprockets at one end of the casing and at the upper ends of the inclined sides, endless chains mounted upon the sprockets and having laterally-extending ears, slats secured to the ears of the chains and forming an apron adapted to slide upon the support, those portions of the slats upon the support being substantially level with the upper portion of the casing and the surface of the ground, and supporting means for holding said apron between the inclined sides.

In testimony whereof I have signed my name to this specification in the presence of two subscribing witnesses.

ALFRED MENARD.

Witnesses:
M. W. SMALL,
ALFRED PEPIN.